Figure 1:
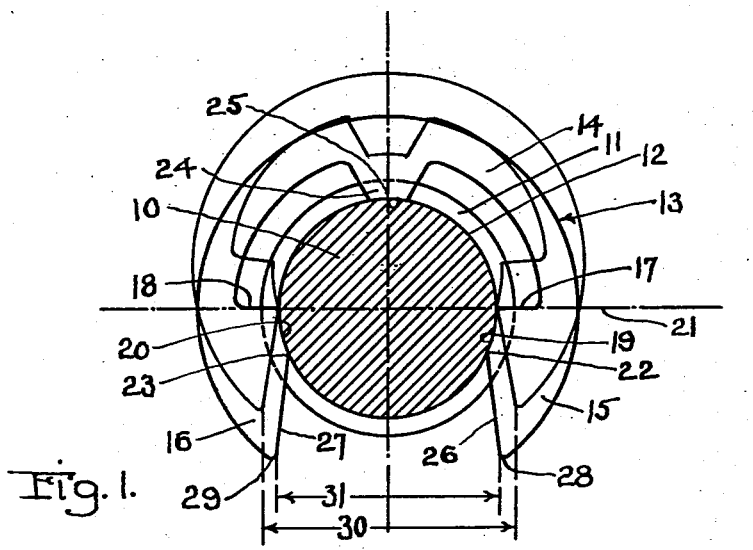

Nov. 26, 1946.   S. A. STOLBERG   2,411,761

RETAINING WASHER AND THE LIKE

Filed June 9, 1945

INVENTOR.
Sven A. Stolberg,

Patented Nov. 26, 1946

2,411,761

UNITED STATES PATENT OFFICE 2,411,761

RETAINING WASHER AND THE LIKE

Sven A. Stolberg, Chicago, Ill., assignor to Russell Electric Company, Chicago, Ill., a corporation of Illinois Application June 9, 1945, Serial No. 598,608

7 Claims. (Cl. 85—5)

My invention relates to improvements in retaining washers and the like, that is, washers which when applied to the shafts or stems with which they are intended to be used serve to retain desired objects or devices on said shafts or stems. Washers of this general type are well known and used very extensively in the arts.

The washer herein disclosed is of the spring type, that is, the presently disclosed washer is intended to be sprung into place on the shaft or stem with which it functions. Furthermore, the present washer is intended to be set into a groove or encircling recess of the shaft or stem, the floor of said recess being of such size that during the washer inserting operation said washer must be slightly sprung into place. Washers of this general type have been known in the arts, but those washers heretofore known of this type have been subject to various objections and imperfections. It is an object of the present invention to provide an improved form of washer of this type meeting and overcoming such objections.

In connection with the foregoing object it is here noted that during the setting of such washers into place they must be slightly expanded or sprung, and that during the final stages of the inserting operation such washers are intended to spring back into locking condition, due to their elasticity. It has been an objection to previously known washers of this type that due to improper designs such washers have frequently been sprung beyond their elastic limits, so that they would not properly lock into place in or on the stems or shafts to which they were applied. Furthermore, when the washer is sprung into place in or on the shaft or stem the design should be such that during such operation a reversal position is reached and passed; at which reversal position the washer is permitted to spring into smaller compass due to its elasticity, effecting the locking function. Heretofore known designs of such washers have been such that frequently such washers have been sprung beyond their elastic limits during the setting operations, with the result that they would not thereafter come into an effective locking condition. It is a prime object of the present invention to provide locking washers of the springing type, but in which provision has been made to prevent such objectionable excessive springing beyond the elastic limit.

It is also noted that when such a type of washer is set into place in or on the shaft or stem, and when it is forced past the position of maximum expansion against its elastic tendency, further inserting movement permits the elastic tendency of the washer to reduce the size of the washer. Such reducing tendency occurs at the "reversal position" previously mentioned herein. Such reducing tendency will then continue until the natural elasticity of the washer has been exhausted, or until a suitably designed and placed stop has been encountered which prevents further movement of the washer with respect to the stem or shaft. It is a prime feature of my present invention to provide such stopping means which will effectively serve to prevent further movement of the washer with respect to the stem or shaft after the "reversal position" is passed, but while there still exists a natural tendency of the washer to continue its reduction of size due to its elasticity. Specifically, it is an object of the present invention to provide such stop in the form of a lug or stud extending inwardly from the central portion of the washer, and so placed that it will engage the surface of the stem or shaft prior to complete exhaustion of the natural elasticity of the washer.

Still more specifically, the washer of the present invention is so formed that it presents three points of contact with the floor of the groove wherein said washer is set. Two of these points comprise the ends of the washer, and these points are formed so that the natural elasticity of the washer brings them together to an amount of separation less than the diameter of the floor of such groove; and the third point of contact formed in or on the washer is placed centrally thereof, and between such first mentioned points. This third point of contact is also formed of such size or positioning that as the washer is expanded during setting into or on the groove and as the "reversal position" is passed, said third point of contact comes into engagement with the floor of the groove prior to full return of the first mentioned points towards each other under their natural elasticity. In other words, when the washer is in its final locking position this third contact point has engaged the floor of the groove and there still remains elasticity in the body of the washer tending to retain said washer at all times in firm engagement with the floor of the groove at three points of contact.

Another way of considering the matter is this: The washer with its three points of contact is so formed, with respect to the shaft or stem with which it is to be used, that when finally set into place in such groove the diameter of a circle drawn through the three contact points, being the diameter of the floor of such groove, is greater than the diameter of the circle to which the washer would naturally contract if fully released, into its natural size.

Still more specifically, it is an object of my present invention to provide a washer having such three points of contact with the floor of the groove, the two outer points of contact being in the form of arcuate surfaces which are of substantially the same radius as the radius of the floor of the groove; the washer being so related to the groove that when in place in such groove said two outer, arcuate contact points or elements come to positions where they lie completely to one side of a diameter of the shaft or stem, so that a full elastic tendency is exerted by the natural resiliency of the washer, tending to retain said washer in its locking position in or on the shaft or stem.

In connection with the last named object, it is a further object to also form the central lug or contact element with an arcuate contacting surface, formed on the radius the same as that of the floor of the groove, so that when the washer is finally sprung into locking position all three of such contacting surfaces will make effective and substantial engagement with the floor of the groove on a circular surface, being the surface of the floor of the groove itself.

It is a further object of the invention to so relate the washer to the shaft or stem, and to the groove into which said washer is set, that when the washer is in its locking position a simple tool, such as a screw driver or the like, may be forced between the washer and the outside surface of the shaft or stem to spring the washer into larger size to permit it to be removed.

A further object of the invention is to make the washer of thickness substantially the same as the width of the groove of the shaft or stem; so that when the washer has been set into final locking position, with its three points of contact with the floor of the groove, and against the walls of the groove, such washer will be effectively held against twisting or deflection, and will be retained securely within a plane normal to the axis of such shaft or stem, as well as being retained against withdrawal directly from the shaft or stem within such plane, except upon application of a sufficient force to expand the washer against its natural elasticity or springiness.

Other objects and uses of the invention will appear from a detailed description of the same, which consists of the features of construction and combinations of parts hereinafter described and claimed.

Figure 2:
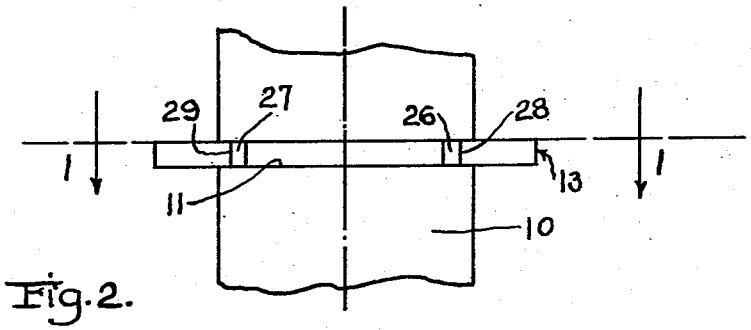

In the drawing:

Figure 1 shows a section through a shaft or stem having applied thereto a washer embodying the features of the present invention, being a section taken at the line 1—1 of Figure 2, looking in the direction of the arrows. In this figure the washer is shown fully in place by means of heavier full lines; and by lighter full lines it is shown in its position at the "reversal position," that is, where it has been expanded to a maximum extent during either insertion or removal to or from the groove; and the amount of spread of the free ends of the washer is shown in this figure for both the conditions of full expansion, and final locking position.

Figure 3:
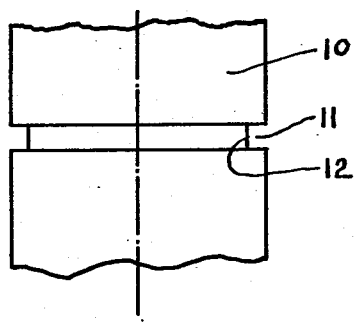

Figure 2 shows a side elevation of a section of shaft or stem having my improved lock washer applied thereto; and Figure 3 shows a side elevation of the same section of shaft or stem with the lock washer removed, and it shows the groove into which the washer is to be set.

Referring to the drawing, I have therein shown my improved locking washer as applied to a shaft or stem 10 which is provided with the encircling groove or recess 11 into which the locking washer is to be set, and with which said locking washer co-operates. Preferably said groove is of rectangular section, as well shown in Figure 3, having the floor 12.

The washer proper is designated in its entirety by the numeral 13. In Figure 1 I have shown said washer by the heavier full lines in its fully inserted position, where it is fully engaged with the groove, and by the lighter lines in the position which it occupies when expanded the maximum amount required for insertion or removal into or from the groove. This washer is of generally arcuate form, preferably cut from sheet metal of resiliency, such as suitable sheet steel. This washer includes the relatively narrow body portion 14 of arcuate form and greater radius than the body of the shaft or stem; said body portion spanning an arc of more than 180 degrees so that its end portions lie both to one and the same side of a diameter of the shaft or stem when the washer is fully inserted into place in the groove, as shown in Figure 1. These end portions of the washer are provided with contact elements or portions 15 and 16 which reach from the positions 17 and 18 of the body portion 14 and terminate in somewhat pointed terminals as shown in Figure 1. These terminal or contact portions 15 and 16 are further provided with the inwardly facing arcuate surfaces 19 and 20 formed on the same radius as the floor of the groove, so that when the washer is set fully into locking position said surfaces 19 and 20 will set firmly and continuously against the floor of the groove as shown by the heavier lines in Figure 1.

It is also noted that both of said surfaces 19 and 20, when the washer is in full locking position, lie to the same side of the diameter line 21 passing through the axis of the shaft or stem. Thus, under these conditions both of said surfaces 19 and 20 lie fully to the same side of said diameter line, and both of said surfaces, and the full arcuate portions or angles thereof which they span, lie to said side of said diameter line. It is also noted that under these conditions the points 22 and 23 which define the ends of said surfaces, lie closer together than the diameter dimension of the floor of the groove. For this reason the insertion or removal of the washer into or from the groove can only be accomplished by expanding the washer an amount equal to the difference between this separation of the points 22 and 23, as compared to the diameter of the floor of the groove.

It is also to be noted that due to the fact that the contacting surfaces 19 and 20 both lie fully to one side of the diameter line 21, it follows that any contracting force existing tending to bring said end portions 15 and 16 closer together will exert a reaction against the floor of the groove tending to shift the washer towards the observer, when viewing the device as shown in Figure 1. In other words, if when the washer stands in the position of the heavy lines of Figure 1 there still exists a resilient force tending to further contract the washer, there will be created a reaction between the end portions surfaces 19 and 20, and the floor of the groove, tending to draw the washer still further in the locking direction, that is, towards the observer in Figure 1. Such condition is created and ensured by proper design of the washer in comparison to the size of the groove into which it is to be set, so that when both the surfaces 19 and 20 have come to a position at least as far as shown by the heavy lines in Figure 1, that is, both to the same side of the diameter line 21, there will still remain some elasticity in the body of the washer, to create a collapsing tendency in said washer tending to ensure further inward spring thereof.

Evidently, under such conditions as just above defined, the reaction thus generated would tend to shift the washer towards the observer in Figure 1, until full collapse of the washer's size had been effected by contraction of the end portions 15 and 16 towards each other.

I have so formed the body portion 14 of the washer that movement thereof at least as far as to a position where the surfaces 19 and 20 lie fully to one side of the diameter line 21 may be effected. Such result is effected by making said portion 14 of sufficient internal diameter to effect the desired result. I have also provided means to limit the movement of the washer in the locking direction, that is, towards the observer in Figure 1, at a point where said surfaces 19 and 20 have shifted at least far enough to bring them both to the same side of the diameter line 21, as shown in Figure 1 by full lines. This limiting means comprises the central lug or stop element 24 formed in the central portion of the body 14 of the washer, said lug being of such size and proportions that as the movement of the washer towards the observer takes place the inner edge surface of such lug comes into contact with the floor of the groove at or slightly after the time when both of the surfaces 19 and 20 have moved to the same side of the diameter line 21, as shown by heavy lines in Figure 1. Any further movement of the washer will then be arrested by such lug 24; and due to the fact that an elastic force still exists tending to shift the washer towards the observer it follows that said lug 24 will be held firmly against the floor of the groove, the surfaces 19 and 20 being in the positions shown in Figure 1 by heavy lines. It is noted that this lug 24 serves to arrest the movement of the washer in the locking direction prior to engagement or contact of the body portion 14 of the washer with the floor of the groove. It is further noted that the contacting edge 25 of such lug is formed on the arc of a circle of the diameter of the floor of the groove, so that when the arresting action takes place all three of the contacting surfaces, 25, 19 and 20 will lie on the circumference of a circle, being the floor of the groove.

Further examination of Figure 1, and comparison of the light and heavy line positions therein shown, discloses that when the washer reaches the light line position the resiliency force reverses direction. Thus, if the washer is being inserted, the end portions 15 and 16 have been expanding from each other, but they now reverse and move towards each other tending to shift the washer into fully inserted position; whereas if the washer is being forced off the shaft or stem, when the position of the light lines is reached the tendency reverses, tending to shift the washer fully off the shaft or stem.

It is also noted that the inwardly facing edges 26 and 27 of the end portions 15 and 16 are so formed that they spread from each other slightly, and this condition exists even when the washer is fully collapsed under its elasticity. Furthermore, the separation of the points 28 and 29 from each other is at such time substantially as great as the diameter of the floor of the groove, so that the washer may be readily set into the groove, the washer being spread or forced apart by the riding of the surfaces 26 and 27 over the floor of the groove.

It is also noted that the thickness of the washer is made substantially as great as the width of the groove, such fact being evidenced by examination of Figure 2. Due to this circumstance, and to the fact that there is provided a three point engagement of the washer with the groove, it follows that when the washer has been set into locking position it is effectively retained against any twisting or warping force which may be applied to it. This condition is further accentuated by the fact that all three of the edges of groove floor engagement, being the edges 19, 20, and 25, are of substantial or material dimension, so that all three of the contacting elements 15, 16, and 24 have engagement with the walls of the groove over substantially large arcuate dimensions. Consequently any warping or twisting force which may be exerted on the washer when in locking position may be effectively resisted.

An examination of Figure 1 and comparison of the washer when in its heavy line position and when in its light line position will disclose that in passing from the one position to the other position the washer is subjected to deforming forces due to application of expanding opposing forces applied at the positions 22 and 23. Since these forces are applied in opposition along a line normal to the neutral line passing through the lug 24 and displaced from the position of said lug by an amount greater than the radius of the floor of the groove, it follows that the washer will be subjected to forces similar to those exerted on a cantilever. These forces will be those produced by a bending or torque action substantially equal to the product of the force exerted on one of the points 22 or 23 multiplied by the displacement of the line passing through these points from the location of the lug 24. The result of such bending action will be production of bending moments which will increase from the points 22 and 23 to a maximum at the position of the lug 24. In order to properly meet this distribution of bending moments the section of the washer measured parallel to such moments should increase from the points 22 and 23 to the position of the lug 24; and it is noted that the lug itself serves to effect a great increase of such section at the very point where these moments are of maximum value, that is, at the location of such lug. Consequently I have produced a form of washer designed to effectively meet and resist the distribution of these moments. For like reason my improved washer will effectively resist numerous spreading and contracting actions due to insertion and/or removal of the washer into and from the groove of the shaft or stem.

For convenience I have shown the expanded and contracted distances between the points 28 and 29 by the distances 30 and 31 in Figure 1.

It is noted that in Figure 1 I have shown fillets at the points of junction of the lug 24 with the curved portion of the body of the washer; and further, that I have shown said lug as being provided with sides which slant outwardly from each other as the curved body of the washer is approached. Thus the sections of the washer increase as the neutral plane is departed from; and of course these fillets and the slant of the sides of the lug may be made either greater or less than indicated in Figure 1.

While I have herein shown and described only a single embodiment of the features of my present invention, still I do not intend to limit myself thereto, except as I may do so in the claims to follow.

I claim:

1. The combination with a stem having an encircling groove with a floor of given diameter, of a retaining washer in conjunction with said stem and groove, said washer comprising a ring section, said ring section terminating in two opposing end contacts each having an arcuate inwardly facing edge surface formed for engagement with the floor of the groove, and each end contact portion extending beyond such groove floor contacting portion and being flared outwardly, together with a central contact lug on said ring section extending inwardly for engagement with the floor of the groove, whereby said end contacts and said lug comprise three contact points for engagement with the floor of the groove, said washer being so proportioned that when said three contact points are in engagement with the floor of the groove both of the end contacts engage the groove floor exclusively at the same side of a diameter line passing through the axis of the stem, and the lug contact engages the groove floor at the opposite side of said diameter line and centrally between the end contacts.

2. Retaining means as specified in claim 1, wherein said washer is made of resilient material, and wherein when said washer is fully released it springs to a form in which said end contacts and said lug contact lie on the circumference of a circle of less diameter than the diameter of the floor of the groove, whereby when the retaining washer is in place in the groove with said three contacts in engagement with the groove floor said washer is under elastic strain and said contacts are retained in pressure contact with the groove floor.

3. Retaining means as specified in claim 1, wherein said three contacts are provided with arcuate groove floor engaging surfaces formed on circular arcs of the same diameter as the diameter of the groove floor.

4. Retaining means as specified in claim 1, wherein said washer is formed of material of thickness substantially equal to the width of the stem groove, whereby when said washer is in place in said groove it substantially completely fills the width of the groove and whereby said three contact portions establish substantially large surface engagements with the walls of the groove, to thereby retain the washer against warping or lateral deflections.

5. Retaining means as specified in claim 1, wherein said central contact lug is of generally truncated triangular form with the base of said lug merged with the ring section, to thereby provide increased bending moment sections at and adjacent to the position of said lug.

6. A retaining washer adapted for use with a stem having a circumferential groove, comprising a discontinuous ring section adapted to be disposed in said groove terminating in two opposing ends each having an arcuate inwardly facing edge surface adapted for engaging the bottom of said groove, an inwardly extending lug on said ring section also adapted for engagement with the bottom of said groove and disposed substantially opposite the discontinuous portion of said ring section, the arcuate inwardly facing edge surfaces being so proportioned and arranged relative to said lug that when said washer is positioned within said groove on said stem said arcuate surfaces both lies substantially entirely on one side of the diameter line of said ring section perpendicular to the diameter line passing through the axis of said lug.

7. A retaining washer adapted for use with a stem having a circumferential groove of a predetermined diameter, comprising a discontinuous ring section terminating in two opposing ends each having an arcuate inwardly facing edge surface for engaging the bottom of said groove, and an inwardly extending lug on said ring section also adapted for engagement with the bottom of said groove and disposed substantially opposite the discontinuous portion of said ring section, the arcuate inwardly facing edge surfaces being disposed so that the center of a line interconnecting those ends of said surfaces adjacent said lug is displaced from the center of the inwardly extending end of said lug by a distance at least as great as one-half of said predetermined diameter.

SVEN A. STOLBERG.